United States Patent Office 2,853,051
Patented Sept. 23, 1958

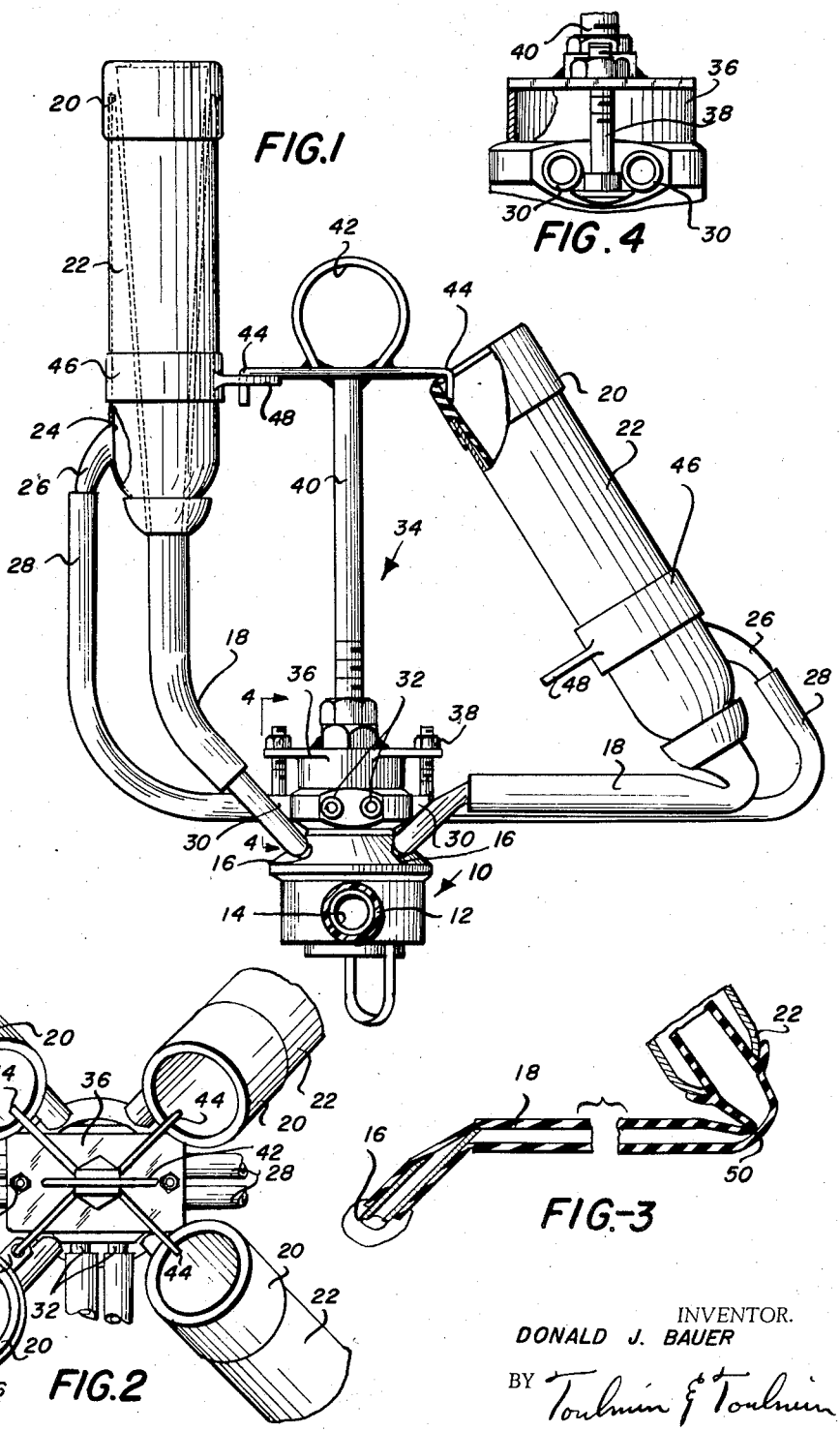

2,853,051

ATTACHMENT FOR MILKING MACHINE

Donald J. Bauer, Norwalk, Ohio

Application May 9, 1957, Serial No. 658,189

2 Claims. (Cl. 119—14.45)

This invention relates to milking machines, and in particular relates to a device adapted for forming an integral part of the milking machine or for being associated therewith as an attachment.

Milking machines of modern construction generally comprise a head to which is connected, by relatively short flexible hoses, the teat cups and which head in turn is connected by flexible tubing with a pulsator mechanism and also with the milk conveying conduits or with a tank which receives the milk from one or two such heads.

The teat cup unit and the head connected therewith to which the pulsator and milk line conduit connects are made necessarily of a substantial size and it sometimes occurs that the unit is thus located fairly close to the ground. What will then sometimes happen will be that one or more of the teat cups will fall from the cow's teat, particularly when the pertaining portion of the udder is about stripped and if the unit is close enough to the ground the cup might fall to the ground or the floor and possibly pick up dirt which could become entrained in the milk.

The particular purpose of the present invention is to provide a milking unit consisting of teat cups and a head connected thereto together with an attachment whereby the teat cups can readily be supported in an elevated position thus keeping them off the ground or floor even though only a single one of the cups is in use.

Another object of this invention is the provision of an arrangement whereby the teat cups other than those actually being used are supported off the floor or ground while at the same time the milk tubes leading thereto are closed off thus preventing foreign matter from being drawn into the milk conduit and also preventing loss of suction in the milk conduit.

A still further object of this invention is the provision of a unit adapted for readily being connected with existing milker units for supporting the teat cups in the aforesaid manner.

These and other objects and advantanges will become more apparent upon reference to the drawings in which:

Figure 1 is a side elevational view of a milking unit of a more or less conventional type having associated therewith a device according to the present invention;

Figure 2 is a plan view looking down on top of the unit of Figure 1;

Figure 3 is a sectional view taken through the tea cup milking line shown for the right side of Figure 1 illustrating the manner in which the milk tube is pinched off when the teat cup is supported by the device according to the present invention; and Figure 4 is a sectional view indicated by line 4—4 on Figure 1 showing the ready attachability of the teat cup supporting device according to the present invention.

Referring to the drawings somewhat more in detail, Figure 1 is an illustration of a milking unit of a substantially conventional nature in which there is a central head 10 having connected therewith a rubber-like conduit 12 through which milk is discharged from the head. Conduit 12 fits over a nipple 14 which is connected through the head with a plurality of upwardly and outwardly extending nipples 16 (see Figure 3) that receive the ends of rubber-like tubes 18 that extend outwardly and upwardly to the teat cup portions 20. A metallic sleeve 22 surrounds each teat cup and is sealed thereto at the top and bottom and there is a space 24 within each metallic sleeve about the teat cup. Space 24 has a nipple 26 leading thereto to which is connected flexible tube 28 leading to and fitting over nipples 30 projecting from an upper part of the head and connected therein with the nipples 32 to which are connected tubes leading to a vacuum pump pulsator arrangement of a conventional type.

According to the present invention the unit is provided with an attachment generally indicated at 34 that consists of a base part 36 resting on top of the head and having wings through which bolts 38 pass. The head of bolts 38 as will be seen in Figure 4 engage beneath a pair of the nipples 30 and in this manner the device is rigidly but detachably connected with the head 10.

Upstanding from base portion 36 is a rod 40 terminating at its upper end in a carrying or supporting eye 42 extending horizontally outwardly from the upper end of rod 40 and have their outer ends bent downwardly at an angle are hooks 44 and which hooks are adapted for engaging inside the upper ends of the teat cups as indicated with the teat cups to the right side of Figure 1. In this manner one or more of the teat cups can be supported in an elevated position on the device 34. According to this invention each metallic sleeve 22 is provided with a band 46 having an apertured ear 48 thereon and which apertured ear is adapted for receiving the downwardly projecting prong of hooks 44. This is illustrated with the teat cup on the left side in Figure 1. This provision permits as few as one of the teat cups to be in use and it will support the entire milking unit so that the cups do not get into the dirt.

As will be seen in Figure 3, when the cups are supported on the hooks 44 the tubes 18 tend to close the ends of their pertaining nipples 16 and in addition thereto the tubes 18 are crimped closed at 50 thus preventing dirt from getting into the milk line through the unused teat cup and also preventing loss of suction through the said cup.

The eye 42 provides a conventional hook for transporting the milk unit or for hanging it up. The device, it will be apparent, can be formed as an integral part of the head so as to be a combination therewith at the time of manufacturing the head or it can be sold as an attachment to be utilized with existing milking units. In any case advantages will obtan that the cups can be supported out of the dirt when less than all thereof are in use with the milk tubes being automatically pinched off when the cups are so supported.

It will be understood that this invention is susceptible to modification in order to adapt it to different usages and conditions, and accordingly it is desired to comprehend such modifications within this invention as may fall within the scope of the appended claims.

I claim:

1. In a milking unit; a plurality of teat cups having metal outer sleeves, a central head, flexible milk tubes extending from said head to each of said teat cups, and a supporting device attached to the head and extending upwardly therefrom, said device having outwardly extending hook means thereon with down turned ends, each of said cups being provided with a laterally extending ear engaged in a corresponding hook.

2. In a milking unit; a plurality of teat cups having metal outer sleeves, a central head, flexible milk tubes extending from said head to each of said teat cups, and a supporting device attached to the head and extending upwardly therefrom, said device having outwardly extending hook means thereon with down turned ends, each of said cups being provided with a laterally extending ear engaged in a corresponding hook, the length of each of said flexible tubes being less than the distance from the hook means to the central head and said tubes being sufficiently rigid so that when the top edge of a cup is engaged with one of said hook means the teat cup will be supported by the rigidity of the tube and the hook means.

References Cited in the file of this patent

FOREIGN PATENTS

| 71,624 | Denmark | Oct. 23, 1950 |
| 914,916 | Germany | June 3, 1954 |